(12) United States Patent
Archer et al.

(10) Patent No.: US 6,971,760 B2
(45) Date of Patent: Dec. 6, 2005

(54) NICHELESS POOL LIGHT SYSTEM

(75) Inventors: Roy Archer, Ocoee, FL (US); Pinhas Paul Koren, Altamonte Springs, FL (US)

(73) Assignee: Super Vision International, Inc., Orlando, FL (US)

( * ) Notice: Subject to any disclaimer, the term of this patent is extended or adjusted under 35 U.S.C. 154(b) by 0 days.

(21) Appl. No.: 10/864,845

(22) Filed: Jun. 9, 2004

(65) Prior Publication Data

US 2004/0223320 A1    Nov. 11, 2004

Related U.S. Application Data

(62) Division of application No. 10/237,634, filed on Sep. 9, 2002.

(60) Provisional application No. 60/318,121, filed on Sep. 7, 2001.

(51) Int. Cl.[7] .............................................. F21V 33/00
(52) U.S. Cl. ..................... 362/101; 362/554; 362/231; 362/373; 362/555
(58) Field of Search ................................ 362/101, 153, 362/249, 294, 373, 800, 231, 551, 554, 555, 362/559, 565

(56) References Cited

U.S. PATENT DOCUMENTS

| | | | | |
|---|---|---|---|---|
| 4,729,076 A | * | 3/1988 | Masami et al. | 362/235 |
| 5,268,828 A | * | 12/1993 | Miura | 362/249 |
| 5,746,497 A | * | 5/1998 | Machida | 362/496 |
| 6,198,872 B1 | * | 3/2001 | Lipson et al. | 385/117 |

* cited by examiner

Primary Examiner—Thomas M. Sember
(74) Attorney, Agent, or Firm—Akerman Senterfitt

(57) ABSTRACT

A swimming pool light assembly is provided. The light assembly includes a reflective plate having a plurality of perforations formed therethrough the reflective plate, and a plurality of LED bulbs. Each LED bulb protrudes through a respective perforation of the plurality of perforations, and a control circuit is selectively operable to produce a plurality of colored lights through the plurality of LED bulbs. The control circuit has a switch which when activated a defined number of times produces a plurality of at least light colors and light patterns. Each of the plurality of at least light colors and light patterns are selected based on the defined number of times the switch is activated.

20 Claims, 2 Drawing Sheets

NICHELESS POOL LIGHT SYSTEM

Applicant herein claims priority to the Provisional Patent Application, U.S. Ser. No. 60/318,121, filed on Sep. 7, 2001, and is a divisional application of U.S. Ser. No. 10/237,634 filed on Sep. 9, 2002.

BACKGROUND OF THE INVENTION

The present invention relates to light emitting diode technology, and more particularly to LED lighting assemblies used in swimming pools.

Currently, water within a swimming pool is illuminated by an incandescent light that is housed within a watertight fixture that is situated within a cavity in one end of a pool wall, or a niche in a wall of the pool, below a waterline. The cavity, or niche, is required in the wall of the pool because the incandescent light has a longitudinal length wherein the niche is needed to place the bulb so that it does not extend into the pool. The watertight fixture has an outer lens that may protrude slightly into the pool. When a new bulb is needed, the whole fixture is removed from the cavity, wherein a power cable supplying electricity to the light is long enough for the fixture to be safely positioned out of the pool water.

Typically, a clear incandescent light bulb is placed in the fixture. If a colored effect is desired, such as blue, red, or green, then a different color bulb is placed in the fixture. In another embodiment, the outer lens is replaced with a colored lens, or a colored lens cover fits over the clear lens. However, in each of these situations, an individual has to manually make a modification to the pool light to produce a desired color. If the individual wanted to continuously vary the colors where the intensity of the light is not lessened, such an option is not available.

Standard electrical wiring connects the watertight fixture to a 110-voltage source. Nonetheless, providing a 110-volt electricity source to such fixtures presents an element of risk that many would prefer to avoid. Also, such incandescent lamp fixtures frequently expose the imperfections in the interior surface of the swimming pool as a consequence of the lamps diffusion of light and the intensity of the light source.

It is known in the prior art to provide LED lighting assemblies for swimming pools but such systems are frequently designed specifically for aboveground pools and hot tubs. There are also known LED lighting assemblies for in-ground pools that house LED arrays that rotate to achieve variations of the emitted color patterns. Typically, such assemblies will employ a combination of red, green and blue LED arrays, which permits the generation of up to 256,000 colors, as is also well known in the art. For example, it is believed that U.S. Pat. No. 6,184,628 ("the '628 patent") teaches the use of predetermined arrays of a plurality of different colored LED bulbs to replace an incandescent pool light where the plurality of different colored LED bulbs are wired in such a manner that the predetermined arrays of plurality of different colored LED bulbs activate at predetermined sequences for predetermined time intervals wherein the bulbs are encased in a lens. Even though LED bulbs are used, providing LED lighting fixtures with brightness to rival incandescent bulbs is still an issue, especially when not all of the LED bulbs are illuminated, as suggested in the '628 patent.

BRIEF SUMMARY OF THE INVENTION

The present invention is directed to a LED light assembly for swimming pools with existing niches for pool lights and new swimming pools where a niche does not need to be formed to provide an underwater pool light. In one preferred embodiment, the LED light assembly comprises a reflective plate comprising a plurality of perforations formed through the reflective plate. A plurality of LED bulbs are provided wherein each LED bulb protrudes through a respective perforation of the plurality of perforations. A control circuit is included that is selectively operable to produce a plurality of colored lights through the plurality of LED bulbs. The control circuit comprises a switch which when activated a defined number of times produces a plurality of light colors and/or light patterns wherein each of the plurality of light colors and/or light patterns are selected based on the defined number of times the switch is activated.

In another preferred embodiment the LED light assembly is operable to replace an incandescent light in an existing niche pool lighting fixture. The light assembly comprises a body comprising a first end and a second end wherein a plurality of symmetrically-shaped portions decreasing in size from the first end to the second end are formed between the first end and the second. A reflective plate is connected to the first end and comprises a plurality of perforations formed through the reflective plate. A plurality of LED bulbs are attached wherein each LED bulb protrudes through a respective perforation of the plurality of perforations. An Edison-style connector is attached to the second end. A control circuit that is selectively operable to produce a plurality of colored lights through the plurality of LED bulbs is located within the fixture. The control circuit comprises a switch which when activated a defined number of times produces a plurality of light colors and/or light patterns wherein each of the plurality of light colors and/or light patterns are selected based on the defined number of times the switch is activated.

In another preferred embodiment the swimming pool light for a pool without a niche comprises a plate comprising a plurality of perforations and a plurality of edges. A plurality of LED bulbs are provided wherein each LED bulb protrudes through a respective perforation of the plurality of perforations. A plurality of sidewall segments are provided where each respective sidewall segment is attached to a respective edge of the plate. A plurality of slots is formed through a sidewall segment of the plurality of sidewalls.

BRIEF SUMMARY OF THE DRAWINGS

The invention itself, both as to organization and method of operation, may best be understood by reference to the following description in conjunction with the accompanying drawings in which like numbers represent like parts throughout the drawings and in which.

DETAILED DESCRIPTION OF THE INVENTION

With reference to the figures, exemplary embodiments of the invention will now be described. The scope of the invention disclosed is applicable to a plurality of uses. Thus, even though embodiments are described specific to swimming pools light fixtures, the present invention is applicable to other uses or applications. For example, the present invention is also applicable to uses in the area of architectural lighting, such as interior and exterior lighting of residential homes, office complexes, and/or other buildings. Similarly, the same or other embodiments may be used in landscaping such as in illuminating sidewalks, pools of water, waterfalls, or any other area that needs to be illuminated including underwater applications.

Figure 1:
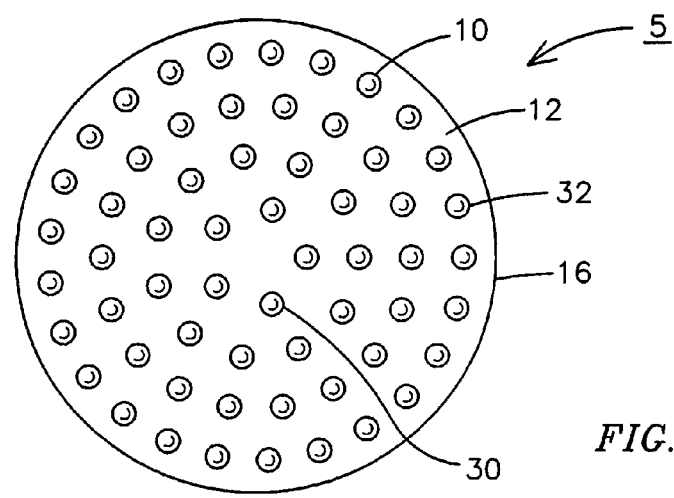
FIG. 1 illustrates a front view of an exemplary embodiment of the present invention.

FIG. 1 illustrates a front view of the present invention having a plurality of LED bulbs, or a LED array, arranged in a predetermined pattern. The present invention 5 employs high power, high intensity LED bulbs 10 that may be cylindrical, square, or substantially square in shape for generating red, green and blue lights, but not limited to these color selections. Alternate embodiments may use various shaped and sized LED bulbs having appropriate power and intensity levels that meet operational requirements for generating red, green and blue at a certain brightness and light dispersion.

Figure 2:
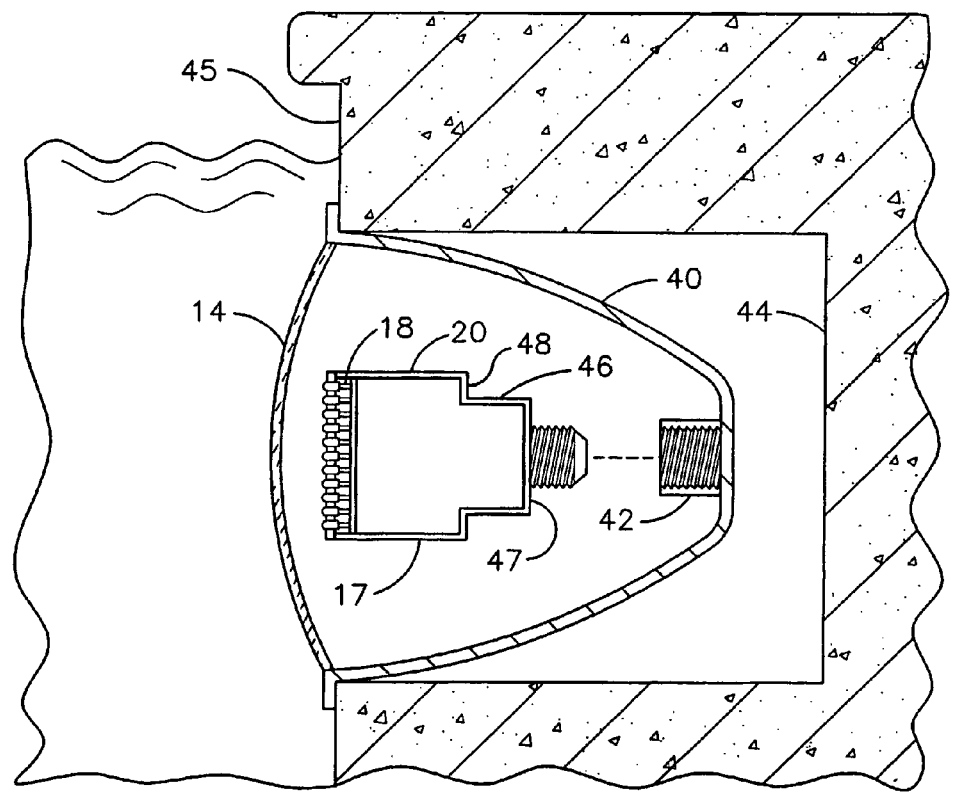
FIG. 2 illustrates a side view of an exemplary embodiment of an assembly of the present invention within a pool light niche.

Each LED bulb 10 is fed through a perforated opening in a white reflective plate 12, such as a polycarbonate plate. The white reflective plate 12 not only reflects light emitting from each LED bulb 10 towards the lens of the fixture 14 as illustrated in FIG. 2, but also assists in dissipating heat from the LED array 16, and provides support for the leads 18 connecting the LED bulbs 10 to a control circuit 20. Using a white plate 12 also reduces color distortion of the LED bulbs 10, while allowing the true illuminated color of the LED bulbs 10 to emit.

As shown in FIG. 1, the LED array 16 is formed by a series of concentric circles where each circle includes a predetermined number of LED bulbs 10. The LED bulbs 10 may be arranged in other patterns as a function of the design and performance requirements for any given application. For example, in a preferred embodiment, the size of LED bulbs 10 used is approximately 5 mm LED bulbs requiring about 20 mA, or ⅕ a watt of power. The present invention 5 does not have a lens over the LED bulbs 10, thus a greater plurality of smaller low wattage bulbs, or larger wattage bulbs, such as 1 to 5 watt bulbs, are also usable, since a lens is not available to trap in the heat produced by the bulbs 10. The lack of a lens combined with the white plate 12 provides for better heat dissipation so that the heat generated by the LED bulbs 10 does not affect the circuit 20 used to illuminate the LED bulbs 10. Under the white plate 12, the electronics 20 are held in place with a thermal conductive epoxy, which also assists in the transfer of heat from the electronics 20 to the bulbs 10. In a preferred embodiment, the leads 18 connecting the LED bulbs 10 to the electronics 20 are long and/or thick leads, thus providing for additional heat dissipation.

The LED arrays 16 of FIG. 1 are adapted to optimize color mixing for the arrays when they are housed in the substantially circular cavity, such as the lightweight fixture, or body 17 described below. Optimization of the color mixing includes using the fewest number of LED bulbs 10 while maintaining a sufficient level of brightness and providing uniformity of light across the LED light fixture 5. Uniformity of light permits the LED lighting assembly 5 of the present invention to use a wide range of lighting patterns so that each pattern achieves the appropriate illuminating effect. In a preferred embodiment, each LED bulb 10 is operable to emit a plurality of colors. Thus, if a white, or clear, light is desired, all of the LED bulbs 10 will illuminate in white, whereas if a spectrum of colors are desired at a single time, a controller will designate a specific color for each LED bulb 10.

One embodiment of the present invention disperses a portion of the emitted light at a downward angle from horizontal of between about 15 and 45 degrees, with about 20 degrees being a suitable angle for use in a standard size swimming pool. It also houses the LED array 16 so that emitted light has an angle of dispersion of at least about 60 degrees. This angle of dispersion coupled with the LED bulbs lower light intensity, relative to white light of a typical incandescent light, provide an illuminating effect that minimizes reflectivity from the interior surface liner of the pool. This effect provides an aesthetic advantage in that imperfections in the interior surface of the pool are not as dramatically exposed and are sometimes eliminated.

Other embodiments use multiple beam angles for emitting light from the LED bulbs 10 to achieve a desired illumination effect. For example, in a swimming pool that is longer than it is wide, one embodiment of the invention would be configured so that the center LED bulbs 30 would emit light at an angle of about 30 degrees from horizontal in a downward direction. LED bulbs 32 around the perimeter of the subassembly would emit light at an angle of about 70 degrees from horizontal in a downward direction. In a large diameter pool that is about the same size in length and width the center LED bulbs 30 would be angled downwardly about 70 degrees from horizontal and the perimeter LED bulbs 32 would be angled either downwardly from horizontal or outwardly from vertical toward the pool wall, at appropriate degrees, to achieve a flooding effect so that the light is dispersed throughout the pool. As can be appreciated from the various applications of the present invention, each LED 10 in an array 16 may be situated at an angle from horizontal or vertical that is different from the rest to achieve a desired result.

Embodiments of the present invention may be adapted for use with fiber optic cable 35 where the fiber optic cable provides a light source to the LED bulbs 10. For example, the LED array 16 may be connected with a fiber optic bundle, which may be comprised of one strand or a plurality of strands. In this embodiment, the fiber optic bundle 35 is appropriately connected at one end to the LED array 16 so that an adequate quantity of light is transmitted to the LED array 16 through the fiber optic cable 35 to achieve sufficient brightness and illumination. The light source for the fiber optic cable 35 may be provided by a remote source or be incorporated in circuit 20 that is part of the light fixture 5.

One advantage of at least one embodiment of the present invention is that it is designed to retrofit existing pool lighting fixtures 40. FIG. 2 is an exemplary illustration of a preferred embodiment. Existing fixtures are placed in a cavity, or niche 44, and typically use a high wattage incandescent lamp screwed into a standard Edison-style base 42 housed within the fixture 40. To retrofit, the existing fixture is removed from its cavity 44 within the pool 45, the existing incandescent lamp is unscrewed, and an embodiment of the LED assembly of the present invention 5, illustrated in FIG.

2, is screwed into the Edison-style base 42 to replace the existing lamp. As illustrated, a preferred embodiment of the LED fixture 5 for an Edison-style base 42 is a lightweight fixture, or body, 17 comprising an inverted stair step configuration 46 or in other words symmetrically shaped portions or sections 46 decreasing ins size from a first end connected to the plate 12 to a smaller second end that an Edison-style connected is attached to. Such a configuration provides a level and secure surface 47, 48 to locate the circuit 20 discussed below.

The LED array 16 is attached to a printed circuit board subassembly 20, covered by the white plate 12. The circuit 20 may be located within the LED bulb fixture that fits within the Edison-style base 44 discussed above. In another preferred embodiment, the circuit 20 is located at a remote location, outside of the pool 45. The circuit of the subassembly 20 controls the patterns of light emitted by the array 16. This circuit 20 may operate in conjunction with an appropriate microprocessor, embedded software and/or other programmed controllers for this or other embodiments of this array.

Figure 3:
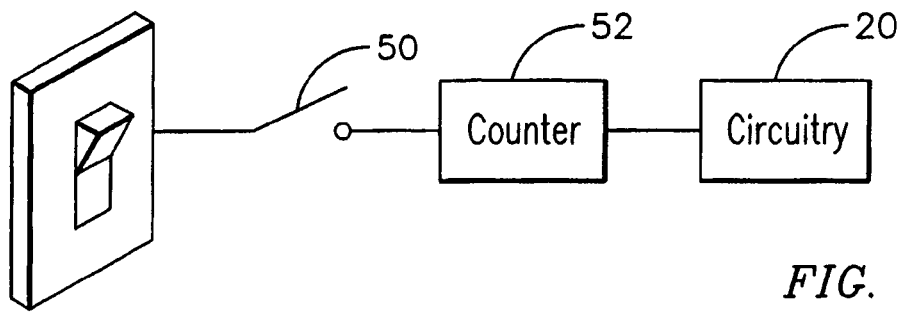
FIG. 3 is a diagram of an exemplary embodiment of a control circuit.

In a preferred embodiment as illustrated in FIG. 3, a switch 50, such as a light switch or a push button switch, is the controller that determines patterns of light emitted by the array 16. If a single white light is desired, the light is switched on. For a blue light, as an example, the light switch is toggled, or switched off and then on a second time. On skilled in the art will recognize that by toggling, the intent is to transition the light from an on state to an off state and then back to an on state. In one embodiment, a counter 52 is provided to count the number of times the switch is cycled. For a red color, the light switch is toggled a second time. For a plurality of colors, or a pattern of colors, the light switch is toggled a third time. One skilled in the art will recognize that depending on a number of colors or patterns defined, the light switch is toggled a predetermined number of times to achieve that desired color or pattern, wherein a final toggle in the series of toggles will turn the light off. In on preferred embodiment, toggling from a first "turn on" color to a desired color or pattern must occur within a predefined period, such as thirty seconds. Otherwise, when the switch 50 is turned off and then back on again, the "turn on" color will repeat. In another preferred embodiment, no timer is used and the switch will rotate through each color or pattern based on which toggle sequence the switch has encountered.

One embodiment of the present invention provides an LED lighting assembly that may operate with a low voltage, 12 or 24-volts, for example, thereby eliminating the need, and the risk, of connecting a 110-voltage source to a traditional incandescent lamp fixture proximate to the water contained in the pool. If necessary, the present invention may employ conventional transformer step-down components for stepping down an existing 110-voltage source to 12 or 24-volts. Such components are provided by a circuit board of the LED assembly 20. Thus, in a preferred embodiment where the circuit 20 is remote from the LED bulbs 10, virtually all maintenance work associated with replacing circuit 20 may be performed outside of the pool 45.

Figure 4:
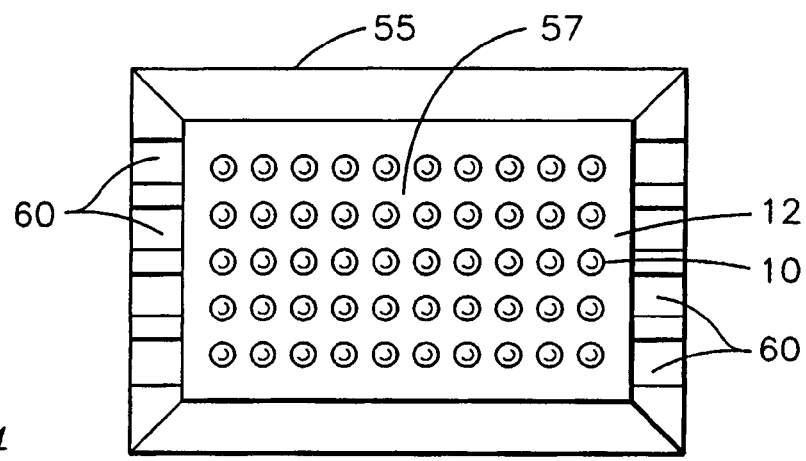
FIG. 4 is a front view of one preferred embodiment of the present invention for installation in a pool without a pool light niche.
Figure 5:
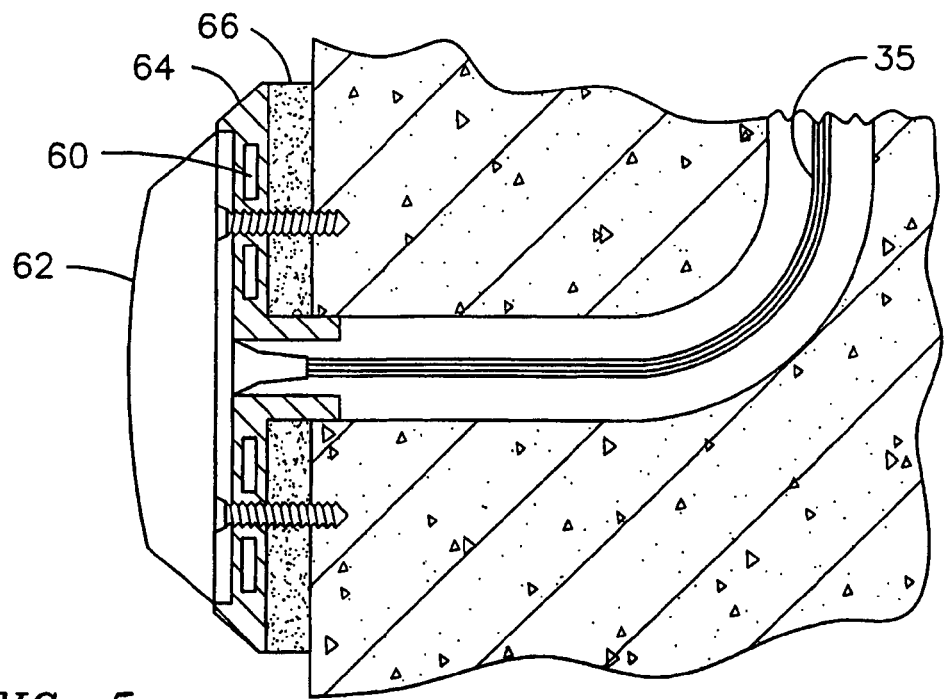
FIG. 5 is a side view of one preferred embodiment of the present invention for installation in a pool without a pool light niche.

FIGS. 4 and 5 are illustrations of an exemplary embodiment of the present invention installed in a swimming pool where a cavity, or niche, is not provided. FIG. 4 is an exemplary front view of the present invention. In a preferred embodiment, the light 55 has a square shape. However, any geometric shape, such as but not limited to a square or circular, and including designer shapes, such as a letter in the alphabet, may comprise the shape of the light assembly looking at it from the front. The LED bulbs 10 are placed in a configuration on a raised center section 57 of the present invention. As discussed above, the LED bulbs 10 protrude through holes in a perforated white 12, or reflective plate. In a preferred embodiment, the plate has a convex, or bowed, configuration to assist in distributing the illuminated light throughout the pool water. In a preferred embodiment illustrated in FIGS. 4 and 5, the sides of the invention have slots or holes 60 which allow for the pool water to flow behind the LED bulbs 10 to provide additional cooling of the LED bulbs 10.

FIG. 5 is a side view of an exemplary embodiment of the present invention. In a preferred embodiment, a lens 62 covers the LED bulbs 10. A bracket mount 64, or mounting plate, is provided which holds the light fixture in place. In a preferred embodiment, a protective surface 66 for the swimming pool wall, such as foam, is provided. In another preferred embodiment, the mounting plate 64 is not provided, and the present invention is mounted directly to the pool wall. In either above discussed embodiment, the slots 60 are provided in either the mounting plate 64 or the light fixture 55 to allow water to pass behind the present invention. A fiber optic bundle 35 is fed through the wall of the pool to the LED bulbs 10 whereas the circuit 20 is located at a remote location outside of the pool.

While the invention has been described in what is presently considered to be a preferred embodiment, many variations and modifications will become apparent to those skilled in the art. Accordingly, it is intended that the invention not be limited to the specific illustrative embodiment, but be interpreted within the full spirit and scope of the appended claims.

What is claimed is:

1. A swimming pool light assembly, said light assembly comprising:
 (a) a plate comprising a plurality of perforations and a plurality of edges;
 (b) a plurality of LED bulbs wherein each LED bulb protrudes through a respective perforation of said plurality of perforations;
 (c) a plurality of sidewall segments wherein each respective sidewall segment is attached to a respective edge of said plate;
 (d) a plurality of slots formed therethrough a sidewall segment of said plurality of sidewalls;
 (e) a mounting bracket operable to connect said pool light assembly to a side of said swimming pool; and
 (f) a protective surface attachment placed between said mounting bracket and said side of said swimming pool.

2. The light assembly of claim 1 further comprising a transparent lens covering said plurality of LED bulbs.

3. The light assembly of claim 1 wherein said plurality of slots are operable for water to flow therethrough.

4. The light assembly of claim 1 further comprising a control circuit selectively operable to illuminate a plurality of colored lights through said plurality of LED bulbs.

5. The light assembly of claim 4 wherein said control circuit comprises a switch which when activated a defined number of times produces a plurality of at least light colors and light patterns wherein each of said plurality of at least light colors and ligbt patterns are based on said defined number of times said switch is activated.

6. The light assembly of claim 4 wherein said control circuit is located at a location remote from said swinuning pool and connectors provide control signals to said light assembly.

7. The light assembly of claim 1 further comprising a fiber optic cable bundle connected to said plurality of LED bulbs providing light to each LED bulb.

8. The light assembly of claim 1 wherein each LED bulb in said plurality of LED bulbs is operable to illuminate in a plurality of colors.

9. A swimming pool light assembly, said light assembly comprising,
   (a) a plate comprising a plurality of perforations and a plurality of edges;
   (b) a plurality of LED bulbs wherein each LED bulb protrudes through a respective perforation of said plurality of perforations;
   (c) a plurality of sidewall segments wherein each respective sidewall segment is attached to a respective edge of said plate;
   (d) a plurality of slots formed therethrough a sidewall segment of said plurality of sidewalls; and
   (e) a control circuit selectively operable to illuminate a plurality of colored lights through said plurality of LED bulbs, wherein said control circuit is located at a location remote from a side of a swimming pool and said swimming pool light.

10. The light assembly of claim 9 further comprising a transparent lens covering said plurality of LED bulbs.

11. The light assembly of claim 9 wherein said plurality of slots are operable for water to flow therethrough.

12. The light assembly of claim 9 wherein said control circuit comprises a switch which when activated a defined number of times produces a plurality of at least light colors and light patterns wherein each of said plurality of at least light colors and light patterns are based on said defined number of times said switch is activated.

13. A swimming pool light assembly, said light assembly comprising:
   (a) a plate comprising a plurality of perforations and a plurality of edges;
   (b) a plurality of LED bulbs wherein each LED bulb protrudes through a respective perforation of said plurality of perforations;
   (c) a plurality of sidewall segments wherein each respective sidewall segment is attached to a respective edge of said plate;
   (d) a plurality of slots formed therethrough a sidewall segment of said plurality of sidewalls; and
   (e) a fiber optic cable bundle connected to said plurality of LED bulbs providing light to each LED bulb.

14. The light assembly of claim 13, further comprising a transparent lens covering said plurality of LED bulbs.

15. The light assembly of claim 13, wherein said plurality of slots are operable for water to flow therethrough.

16. The light assembly of claim 13, further comprising a mounting bracket operable to connect said pool light assembly to a side of said swimming pool.

17. The light assembly of claim 16, further comprising a protective surface attachment placed between said mounting bracket and said side of said swimming pool.

18. The light assembly of claim 13, further comprising a control circuit selectively operable to illuminate a plurality of colored lights through said plurality of LED bulbs.

19. The light assembly of claim 18, wherein said control circuit comprises a switch which when activated a defined number of times produces a plurality of at least light colors and light patterns wherein each of said plurality of at least light colors and light patterns are based on said defined number of times said switch is activated.

20. The light assembly of claim 18, wherein said control circuit is located at a location remote from said swimming pool and connectors provide control signals to said light assembly.

* * * * *